United States Patent [19]
Bosch

[11] Patent Number: 5,250,196
[45] Date of Patent: Oct. 5, 1993

[54] METHOD AND DEVICE FOR WORKING UP UNUSED CONCRETE MIX AND/OR MORTAR

[75] Inventor: Bertholdus P. Bosch, Berlicum, Netherlands

[73] Assignee: Heijmans Materieel Beheer B.V., Netherlands

[21] Appl. No.: 899,761

[22] Filed: Jun. 17, 1992

[30] Foreign Application Priority Data

Jun. 20, 1991 [NL] Netherlands ............ 9101062

[51] Int. Cl.$^5$ .................. B01D 21/26; B01D 15/00
[52] U.S. Cl. .................. 210/780; 210/767; 210/805; 210/195.1; 210/257.1; 209/12; 209/254; 209/268
[58] Field of Search .......... 210/769, 767, 195.1, 210/257.1, 805, 780; 209/12, 254, 269, 268, 10; 141/404

[56] References Cited

U.S. PATENT DOCUMENTS

| | | | |
|---|---|---|---|
| 1,183,805 | 5/1916 | Downerd | 209/268 |
| 1,467,355 | 9/1923 | Christensen | 209/268 |
| 2,703,648 | 3/1955 | Stücheli | 209/254 |
| 3,545,501 | 12/1970 | Hohlbaum | 141/104 |
| 4,154,671 | 5/1979 | Borges | 209/10 |
| 4,204,949 | 5/1980 | Jedo et al. | 209/254 |
| 5,051,166 | 9/1991 | Heimhard et al. | 209/269 |

FOREIGN PATENT DOCUMENTS

| | | |
|---|---|---|
| 0091600 | 10/1983 | European Pat. Off. |
| 0269576 | 5/1987 | European Pat. Off. |
| 2847002 | 5/1980 | Fed. Rep. of Germany |
| 8703058 | 9/1988 | France |
| 8701253 | 12/1988 | Netherlands |

*Primary Examiner*—Robert A. Dawson
*Assistant Examiner*—Ana M. Fortuna
*Attorney, Agent, or Firm*—Hovey, Williams, Timmons & Collins

[57] ABSTRACT

The invention relates to a method for working up unused concrete mix and/or mortar whereby the unused concrete mix and/or mortar is gradually supplied to and distributed over a sieve during spraying of the unused concrete mix and/or mortar with water in such a way, that grit or the like which is in the unused concrete mix and/or mortar is cleaned by rinsing and remains on the sieve in order to be discharged therefrom. The material passing through the sieve and consisting of a mixture of sand, cement and water, is supplied to a separation device wherein the sand is separated from said mixture. The remaining mixture of water and cement is returned at least partly from the discharge of said separation device towards the supply side of the separation device.

8 Claims, 1 Drawing Sheet

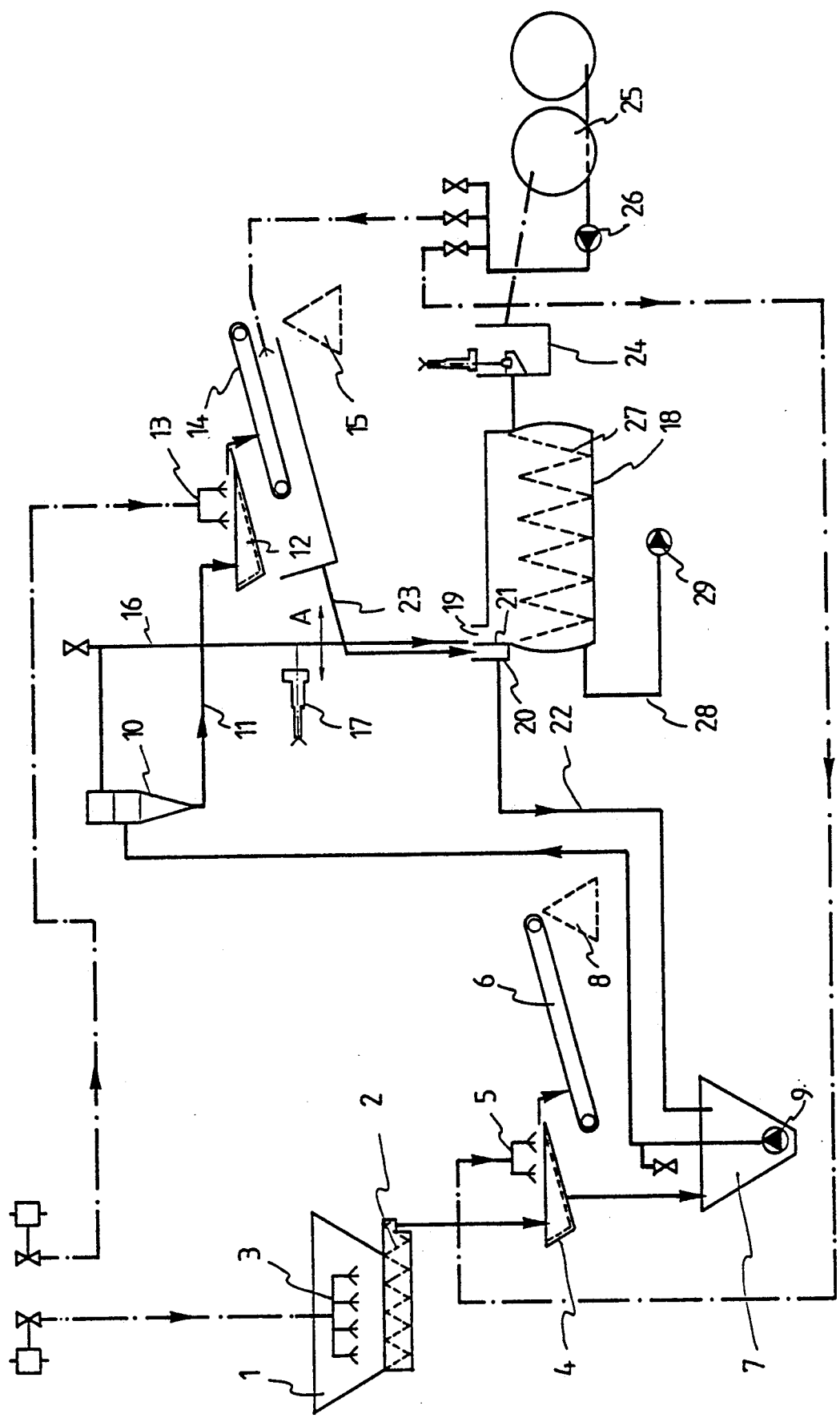

METHOD AND DEVICE FOR WORKING UP UNUSED CONCRETE MIX AND/OR MORTAR

The invention relates to a method and device for working up unused concrete mix and/or mortar whereby the unused concrete mix and/or mortar is gradually supplied to and distributed over a sieve during spraying of the unused concrete mix and/or mortar with water in such a way that grit or the like which is in the unused concrete mix and/or mortar is cleaned by rinsing and remains on the sieve in order to be discharged therefrom, whilst the material moving through the sieve comprising a mixture of sand, cement and water is supplied to a separation device wherein the sand is separated from said mixture.

Such a method is known from the Dutch patent application 8701253.

In principle said method is satisfying, however in practice it has been shown, that there is a need for a still better separation of the mixture of sand, cement and water. Is has appeared, that this is can be obtained by increasing the capacity of the separation device which requires however also an increase of the mixture of sand, cement and water supplied to the separation device.

Now according the invention this can be obtained in a simple way when the remaining mixture of water and cement from which the sand is separated is at least partly returned from the discharge of the separation device towards the supply side of the separation device.

By using said method the quantity of liquid required by the increased capacity of the separation device can be maintained at the required level in a simple way by replenishment of the water used for spraying of the unused concrete mix and/or mortar in order to clean the grit and the like by rinsing with a part of the water, which is passed through the separation device and contains only cement.

A further aspect of the invention relates to a device for working up unused concrete mix and/or mortar comprising a collecting tank for receiving the unused concrete mix and/or mortar and conveyor means for supplying the unused concrete mix and/or mortar to a sieve, there being arranged spraying means for supplying water above said sieve and a further collecting tank for collecting the mixture of water, sand and cement below said sieve, said further collecting tank being in communication with a device for separating sand from the mixture collected in said further collecting tank, as known from the above cited Dutch patent application 8701253.

According the invention a duct for discharging a mixture of water and cement being in communication with the device for separating sand can be brought at choice in communication with a buffer tank or with said further collecting tank.

By using such a structure it can be obtained in a simple way, that at least a part of the mixture of water and cement, that in the device for separating sand has been separated from the mixture of water, cement and sand supplied to that device can be supplied again to the device for separating sand, so that there can be made optimal use of the water.

Hereinafter the invention will be explained by means of the enclosed figure wherein a device according the invention has been shown diagrammatically.

The operation of said device corresponds mainly with the operation of the device described in the above cited Dutch patent application 8701253 and it is deemed, that the contents of said application has been included here, so that it will not be necessary to explain in a detailed way the working of the various parts of said device.

The sole FIGURE represents the device of the invention, for separating coarse aggregates, fine aggregates and residual water from concrete mix and/or mortar.

The device shown in the FIGURE comprises a collecting tank 1 wherein unused concrete mix and/or mortar, e.g. from a customary truck for transporting concrete of mortar can be dumped. In a lower part of the collecting tank there has been mounted a conveyor screw 2. Further there has been mounted a spray duct 3 in the collecting tank 1.

As has been described in the Dutch patent application 8701253 the material dumped in the collecting tank 1 is supplied to a vibrating sieve 4 by means of the conveyor screw 2, whilst above the vibrating sieve 4 there has been arranged a spray duct 5. By spraying the unused concrete mix and/or mortar on the vibrating sieve the grit or the like in the unused concrete mix and/or mortar is separated and is dumped on a conveyor belt 6 near one end of the vibrating sieve, whilst a mixture of sand, water and cement passes through the sieve and is discharged to a collecting tank 7 arranged below said sieve.

By means of the conveyor belt 6 the grit is dumped e.g. on a heap 8 so that it eventually can be used again.

The mixrure of water, cement and sand collected in the collecting tank 7 can be supplied to a cyclone separation device by means of a pump 9, said separation device 10 being sized in such a way, that in said separation device the coarse parts of the mixture formed by the sand are separated and are supplied to a vibrating sieve 12 by means of a discharge duct 11. The sand lying on the vibrating sieve 12 is sprayed once more by means of water supplied via a spray duct 13 in order to separate any remaining cement from the sand. Sand falling from an end of the vibrating sieve 12 is discharged by means of a conveyor belt 14 and e.g. dumped on a heap 15 so that it eventually can be used again.

The mixture of water and cement separated from the mixture of sand, water and cement in the separation device is discharged via a duct 16. At least the lower end of the duct 16 has been flexible in such a way that the duct 16 can be displaced in a horizontal direction as indicated by means of the double arrow a over a particular distance by means of an adjusting mechanism 17. The open lower end of the duct 16 is situated at the level of the upper side of a buffer tank 18 namely near a supply opening 19 situated near the upper side of said buffer tank 18.

Near the supply opening 19 there has been fixed a collecting bin 20 to a side of the buffer tank 18, said collecting bin 20 being separated of the supply opening 19 by means of a partition 21.

By displacing the duct 16 in the direction according arrow A by means of the adjusting device 17 the open lower end of the duct can be arranged in a first position, wherein the mixture of water and cement flowing from the duct 16 flows in the buffer tank 18, and in a second position wherein said mixture flows from the duct 16 into the collecting bin 20. By means of a duct 22 the collecting bin 20 is in open communication with the collecting tank 7, so that then the mixture of water and cement flowing from the duct 16 can be returned towards the collecting tank 7 via de collecting bin 20.

The adjusting device 17 can be operated automatically depending on the level of the water in the collecting tank 7, so that said collecting tank will be always filled in a sufficient way. By using the displaceable duct 16 there are not needed valves of the like for diverting the water flow from the duct 16 towards the buffer tank 18 or towards the collecting tank 7, such valves or the like being liable for jamming.

As also will be clear from the figures the mixture of water and cement coming from the vibrating sieve will be supplied directly to the collecting bin 20 via duct 23 and from said collecting bin 20 towards the collecting tank 7.

In the collecting tank 18 wherein the mixture of cement and water is supplied, the cement can settle and from time to time there can be discharged water, substantially free of cement via a overflow tank 24 towards supply vessels 25 from which the water can be pumped by means of a pump 26 and can be supplied to various spraying means for spraying purposes as will be clear from the diagram shown in the figure. From time to time a concentrated mixture of water and cement, which can be agitated by means of an agitating device 27 mounted in the buffer tank can be discharged via a duct 28 connected on the tank and a pump 29 in order to be used again for the manufacturing of new concrete.

I claim:

1. A device for the separate recovery of coarse aggregates, fine aggregates and residual water from a concrete mix and/or mortar comprising:
   a first collecting tank for receiving the concrete mix and/or mortar;
   a first vibrating sieve for receiving the concrete mix and/or mortar from the collecting tank;
   conveyor means associated with said collecting tank for transferring the concrete mix and/or mortar to said first vibrating sieve;
   conveyor means associated with said collecting tank for transferring the concrete mix and/or mortar to said first vibrating sieve;
   spraying means located above said first vibrating sieve for supplying water to said first vibrating sieve;
   a second collecting tank located below said first vibrating sieve for collecting a mixture of water, sand and cement passing through said first vibrating sieve;
   a separating device downstream from said first vibrating sieve for separating sand from said mixture, said separating device having a first outlet for discharging sand and a second outlet for discharging a mixture of water and sand;
   pump means for passing said mixture from said further collecting tank to said separating device;
   a second vibrating sieve positioned remotely relative from said first vibrating sieve and oriented for receiving the discharge from said first outlet;
   a substantially vertical duct presenting an upper end for communicating with said second outlet and a lower end, said duct including a flexible portion;
   a buffer tank presenting first discharge means including an overflow for discharging water and second discharge means for discharging a concentrated mixture of water and cement; and
   drive means operatively connected to said duct for displacing said lower end between a first position for delivering said mixture of sand and water from said first outlet to said second collecting tank and a second position for delivering said mixture of sand and water from said first outlet to said buffer tank.

2. A device as set forth in claim 1, wherein said buffer tank includes a top and a supply opening, and further comprising a collecting bin located adjacent said top, and a partition positioned between said supply opening and said collecting bin for permitting displacement of lower end of said duct in alternate locations on either side of said partition.

3. A device as set forth in claim 1, including means coupling said separating device in communication said second vibrating sieve for discharging sand from the separating device to said second vibrating sieve, and further including means for spraying water on said second vibrating sieve and means for discharging water from said second sieve to said second collecting tank.

4. A device as set forth in claim 1, including a pump positioned in said first collecting tank for pumping water, sand and cement from the first collecting tank to the separation device.

5. A method for separating the components of unused concrete mixture and/or mortar comprising the steps of:
   receiving the unused concrete mix and/or mortar in a receptacle;
   discharging the contents of the receptacle onto a first vibrating sieve;
   spraying water onto the sieve for washing to contents remaining thereon;
   vibrating the first sieve to sift the contents received thereon;
   collecting a mixture of water, sand and cement passing through said first sieve in a collecting tank;
   pumping said mixture to a separating device;
   separating sand from said mixture;
   passing the sand separated by said separating device to a second vibrating sieve located remotely from said first sieve;
   discharging the unseparated sand, water and cement from said separating device to a substantially vertical duct wherein at least a portion of said vertical duct is horizontally displaceable;
   shifting said portion of said duct between a first position and a second position;
   directing the unseparated sand, water and cement to the collecting tank when said displaceable portion is in said first position; and
   directing the unseparated sand, water and cement to a buffer tank when said displaceable portion is in said second position.

6. A method as set forth in claim 5, including the step of discharging water from said buffer tank when the volume of the unseparated sand, water and cement in the buffer tank exceeds a predetermined quantity.

7. A method as set forth in claim 6, including the step of discharging a concentrated mixture of water and cement from said buffer tank.

8. A method as set forth in claim 5, including the step of spraying water on the second vibrating sieve, collecting the water so sprayed, and discharging the sprayed water to the collecting tank.

* * * * *